UNITED STATES PATENT OFFICE.

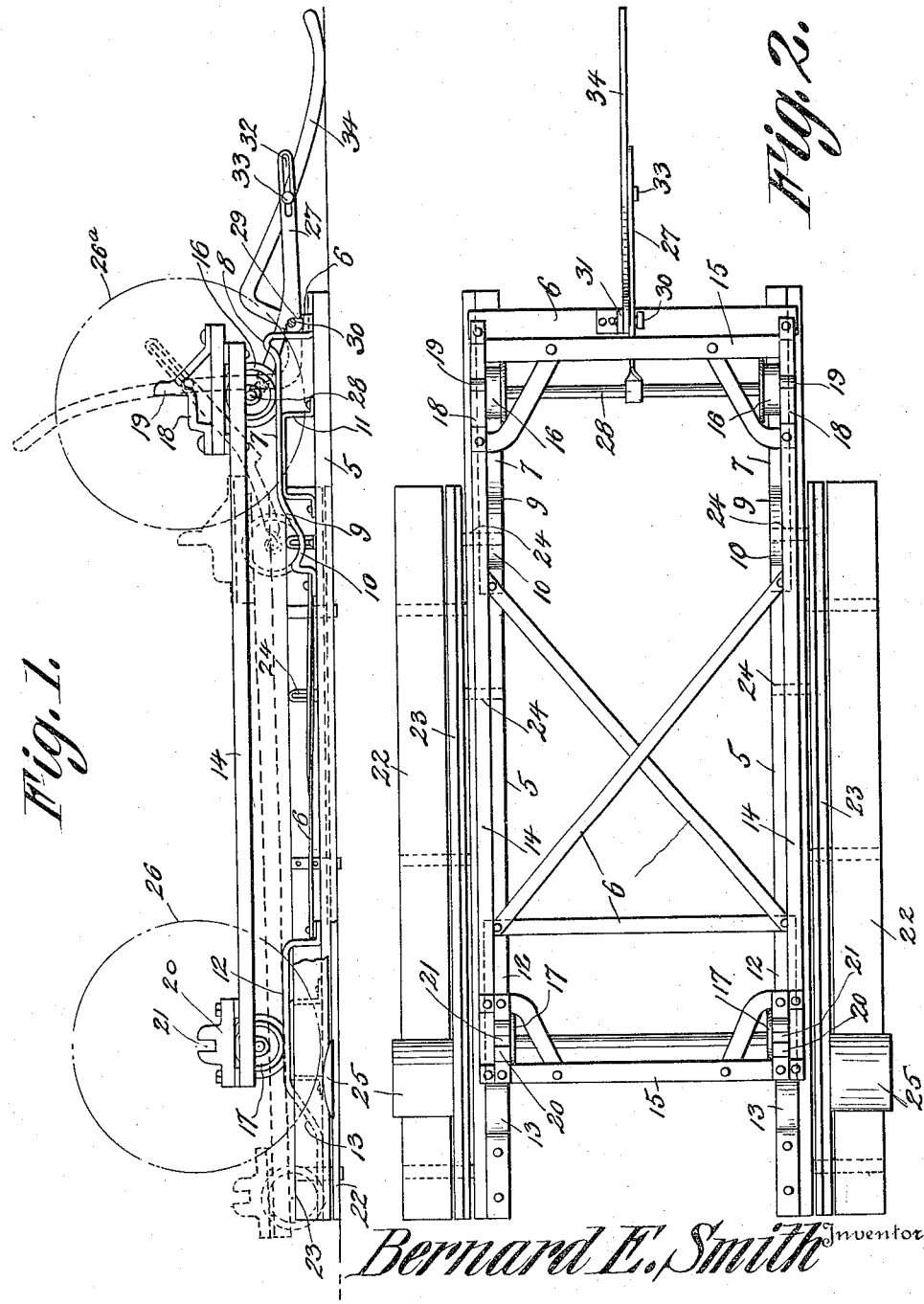

BERNARD E. SMITH, OF POND CREEK, OKLAHOMA.

LIFTING DEVICE.

1,170,855.     Specification of Letters Patent.     Patented Feb. 8, 1916.

Application filed March 20, 1915. Serial No. 15,860.

*To all whom it may concern:*

Be it known that I, BERNARD E. SMITH, a citizen of the United States, residing at Pond Creek, in the county of Grant and State of Oklahoma, have invented certain new and useful Improvements in Lifting Devices, of which the following is a specification.

This invention relates to lifting devices designed for use in garages, sheds and other places where motor vehicles are stored when not in service, the object of the device being to lift the car off the floor or ground so as to take all weight off the tires, and also to render the wheels, tires and other parts readily accessible for repairs, etc.

The invention has for its object to provide a lifting device of the kind stated which is simple in construction, and efficient in operation, the device being automatically operated by means of a novel combination and arrangement of parts to be hereinafter described and claimed.

In order that the invention may be better understood, reference is had to the accompanying drawing in which—

Figure 1 is a side elevation of the device partly in section and with the parts in the position when the car is elevated, and Fig. 2 is a plan view of the device.

Referring specifically to the drawing, 5 denotes two parallel longitudinal sills which are rigidly connected in laterally spaced relation by suitable cross braces 6, and mounted on the floor of the shed or other building in which the car is to be stored.

At its forward end each sill 5 supports an elevated horizontal rail 7 having at its forward end a raised portion 8, and at its rear end an incline 9, at the bottom of which latter is a depression 10. The rails of the respective sills are directly opposite each other, and they may be formed of flat metal bars suitably secured to the sills, and having upward bends at their ends, as shown in Fig. 1, to bring the tread portion a suitable distance above the sills. Intermediate their ends, the rails rest on braces 11 mounted on the sills, whereby they are prevented from sagging under the weight of the car.

At its rear end, each sill 5 supports an elevated horizontal rail 12, braced in the same manner as the rails 7, having an incline 13 at its rear end. These rear rails of the respective sills are also directly opposite each other.

Mounted for travel on the rails 7 and 12 is a wheeled lifting frame composed of parallel longitudinal side bars 14 connected at their ends by cross bars 15, and provided with flanged front and hind wheels 16 and 17, respectively. The wheels 16 are mounted on the rails 7, and the wheels 17 on the rails 12. On top of the forward ends of the side bars 14 are rigidly mounted axle-supporting members 18 having upstanding abutments 19 in front. On top of the rear ends of the side bars 14 are rigidly mounted axle-supporting blocks 20 having top recesses 21 to accommodate the usual truss rods of the rear axle of the car.

Alongside the sills 5, on the outside thereof, are guides for properly centering the car with respect to the wheeled lifting frame. These guides comprise boards 22 resting on the floor or the ground, and having upstanding boards 23 extending along their inner edges. The guides are shown partly broken away in Fig. 1, and they are adjustably secured to the sills by slotted angle brackets 24.

When the device is not in use the lifting frame is in lowered position as shown dotted in Fig. 1, the wheels 16 being in the depressions 10 at the bottom of the incline 9, and the wheels 17 being at the bottom of the incline 13. If now the car is driven over the device until its front axle strikes the abutments 19, the lifting frame is carried forward, and as the wheels mount the inclines, the frame is elevated until the wheels pass onto the elevated portions of the rails 7 and 12, these portions of the rails being at the same level. On the boards 22, alongside the inclines 13, are mounted blocks 25 having a double incline. As the lifting frame travels forward with the car, and the wheels 17 mount the incline 13, the hind wheels of the car (shown dotted in Fig. 1 at 26) mount the blocks 25, and as soon as the wheels 17 reach the elevated portion of the rails 12, the wheels 26 pass off the blocks 25, the momentum of the car carrying the lifting frame forward a sufficient distance to leave the wheels clear of the ground. It will be noted that the bottom of the inclines 9 is on a higher level than the bottom of the inclines 13, and hence, when the lifting frame is in lowered position as shown dotted in Fig. 1, the axle support 18 is higher than the axle support 20. The front portion of the car is therefore lifted when the wheels 16 mount the inclines 9, and when said wheels reach the top of the incline and continue forward on the elevated portion of the rails 7 by the momentum, the front wheels of the car (shown dotted at 26ª in Fig. 1) are also elevated above the ground. The raised portions 8 of the rails 7 serve as stops to prevent the lifting frame from going forward too far. A locking device is also provided for preventing the lifting frame from rolling back to lowered position, said device comprising a latch lever 27 pivoted to the axle 28 of the wheels 16, and having a hook 29 intermediate its ends adapted to catch over a keeper bolt 30. On the front cross brace 6 of the sills 5 is mounted a bracket 31 which carries the bolt 30. The free end of the lever 27 has a slot 32 in which works a pin 33 carried by an angle lever 34 which is pivotally supported by the bolt 30. When the lifting frame is in lowered position, the levers 27 and 34 are in raised position, and as the frame advances, they drop forward, the hook 29 dropping over the bolt 30 and thus preventing the frame from going back to lower the car. When the car is to be lowered the lever 34 is swung upward, whereby, through its connection with the lever 27, the latter is released from the bolt 30, and the lifting frame is pushed rearward until the wheels thereof reach the inclines, whereupon they roll down the same and lower the frame until the wheels of the car again reach the ground, after which the car may be backed off the device. The axle-supporting blocks of the lifting frame must, of course, be properly spaced according to the spacing of the front and rear axles of the car. The depressions 10 prevent the lifting frame from going back too far, the wheels 16 seating in said depressions when the frame is down.

I claim:

1. A lifting device comprising a support having front and rear elevated rails provided with inclines, the bottom of the inclines of the front rails being on a higher level than the bottom of the inclines of the rear rails, a lifting frame above the support, front and hind wheels supporting said frame, said wheels being located to travel respectively on the front and rear rails and the inclines thereof, lifting inclines for the hind wheels of the vehicle located alongside the inclines of the rear rails, on the outside thereof, off which lifting inclines said hind wheels pass when the hind wheels of the lifting frame reach the top of the inclines of the rear rails, a pivoted latch lever carried by the forward end of the lifting frame, a keeper on the support for said lever, a lever pivoted to the support, and a connection between said lever and the latch lever for releasing the latter from its keeper and thereafter starting the lifting frame rearward toward the inclines of the rails.

2. A lifting device comprising a support having front and rear elevated rails provided with inclines, the bottom of the inclines of the front rails being on a higher level than the bottom of the inclines of the rear rails, a lifting frame above the support, front and hind wheels supporting said frame, said wheels being located to travel respectively on the front and rear rails and the inclines thereof, lifting inclines for the hind wheels of the vehicle located alongside the inclines of the rear rails, on the outside thereof, off which lifting inclines said hind wheels pass when the hind wheels of the lifting frame reach the top of the inclines of the rear rails, a pivoted latch lever carried by the forward end of the lifting frame and having a hook, a bolt carried by the support and engageable by the hook, a lever pivoted on the bolt, and a connection between said lever and the latch lever for releasing the latter from its keeper and thereafter starting the lifting frame rearward toward the inclines of the rails.

In testimony whereof I affix my signature in presence of two witnesses.

BERNARD E. SMITH.

Witnesses:
R. E. SNYDER,
T. G. ROBBINS.

Copies of this patent may be obtained for five cents each, by addressing the "Commissioner of Patents, Washington, D. C."